(12) United States Patent
Chung et al.

(10) Patent No.: US 12,627,067 B2

(45) Date of Patent: May 12, 2026

(54) CORNER REFLECTING DEVICE AND CORNER REFLECTING SYSTEM

(71) Applicant: NATIONAL CENTRAL UNIVERSITY, Taoyuan City (TW)

(72) Inventors: Chih-Chung Chung, Taipei City (TW); Chun-Cheng Lin, Taoyuan City (TW)

(73) Assignee: NATIONAL CENTRAL UNIVERSITY, Taoyuan City (TW)

( * ) Notice: Subject to any disclaimer, the term of this patent is extended or adjusted under 35 U.S.C. 154(b) by 288 days.

(21) Appl. No.: 18/421,374

(22) Filed: Jan. 24, 2024

(65) Prior Publication Data

US 2024/0405442 A1      Dec. 5, 2024

(30) Foreign Application Priority Data

Jun. 5, 2023    (TW) .................................. 112120872

(51) Int. Cl.
H01Q 15/18          (2006.01)
G01S 13/02          (2006.01)

(52) U.S. Cl.
CPC ......... H01Q 15/18 (2013.01); G01S 13/0218 (2013.01)

(58) Field of Classification Search
CPC ........................... H01Q 15/18; G01S 13/0218
See application file for complete search history.

(56) References Cited

U.S. PATENT DOCUMENTS

| | | | |
|---|---|---|---|
| 4,990,918 A | 2/1991 | Michelson et al. | |
| 2020/0341113 A1* | 10/2020 | Shen ...................... | G01S 13/931 |
| 2023/0192313 A1* | 6/2023 | Pos ........................ | B64D 45/04 |
| | | | 701/15 |

FOREIGN PATENT DOCUMENTS

| | | | |
|---|---|---|---|
| CN | 207096435 U | * | 3/2018 |
| CN | 211180183 U | | 8/2020 |
| CN | 114942039 A | | 8/2022 |

* cited by examiner

*Primary Examiner* — Vladimir Magloire
*Assistant Examiner* — Nazra Nur Waheed
(74) *Attorney, Agent, or Firm* — Muncy, Geissler, Olds & Lowe, P.C.

(57)          ABSTRACT

A corner reflecting device has at least one corner reflector. The reflector has a first right triangle plate, a second right triangle plate and a first isosceles right triangle plate, and a shape of the first right triangle plate is the same as a shape of the second right triangle plate, and is not an isosceles right triangle plate. A long leg of the second right triangle plate is connected with a long leg of the first right triangle plate. Two legs of the first isosceles right triangle plate are connected with a short leg of the first right triangle plate and a short leg of the second right triangle plate respectively. An intersection of the first right triangle plate, the second right triangle plate, and the first isosceles right triangle plate forms a leak hole.

13 Claims, 14 Drawing Sheets

CORNER REFLECTING DEVICE AND CORNER REFLECTING SYSTEM

BACKGROUND

Technical Field

The present disclosure is related to a corner reflecting device and a corner reflecting system, which simplifies the installation process in order to let the corner reflecting device be directly laid flat on a hillside, and designs the length ratios of the corner reflector in order to adapt the incident angle directions of the incident radar waves of various satellites, further that, the area is decreased and the reflection amount of the reflected radar wave is increased, and the measurement accuracy is improved.

Related Art

A corner reflector is a device that reflects radar waves and is usually constructed by three isosceles triangle plates that are mutually perpendicular and intersected. It is called echo reflector (also known as trihedral corner reflector). Moreover, there is another corner reflector (also called dihedral corner reflector) assembled by two plates perpendicular to each other, and has higher reflection efficiency under the condition of the same area. This kind of corner reflector may have a higher overlap to the incident direction of the incident radar wave, so as to maintain accuracy. Compared with the aforesaid dihedral corner reflector, the trihedral corner reflector has a larger error range to be used.

According to the present technical literatures, the length of the hypotenuse of the trihedral corner reflector (i.e., the length of the hypotenuse of the isosceles right triangle plate) is usually suggested set to be 1.5 meters, in order to approach the purposes of saving cost and better efficiency. In other words, increasing the length of the trihedral corner reflector is to improve performance, but the disadvantage that comes with it is an oversized volume, which causes the problems of performance improvements being out of proportional costs; on the other hand, if the condition is vice versa, the performance may be insufficient.

Traditional large corner reflectors are expensive and large. Therefore, some literatures discuss the possibility of micro corner reflectors replacing large corner reflectors. At last, the conclusion is that although the reflection amount of the micro corner reflector is as low as hardly identifying the differences between noise signals and reflection signals. A special arrangement can still solve the problem, that is, the reflection signals of the micro corner reflector can be found. Simply speaking, the prior micro corner reflector still has the disadvantage of less performance.

With respect to FIG. 1A, FIG. 1B and FIG. 1C, which illustrate a schematic 3-D view of a prior corner reflector in different angles, a schematic view shows an effective aperture of the prior corner reflector and an equivalent view of reflected radar waves of the prior corner reflector. As shown in FIG. 1A, a prior corner reflector 1 is constructed by three isosceles right triangle plates 11a, 11b, 11c, which are perpendicularly connected to each other for each pair, and made of radiation-reflective materials. For the aspect of usage, each connecting point of each pair of the three isosceles right triangle plates 11a, 11b, 11c is lower than the horizontal plane. That is, compared with the horizontal plane, the three isosceles right triangle plates 11a, 11b, 11c form a structure that is a concave configuration, which is lower than the horizontal plane, as shown in the left figure, left corner reflector, of FIG. 1A. If rotating the left figure toward the horizontal plane, a 3-D view of the corner reflector 1 will be shown in the right figure, right corner reflector, of FIG. 1A.

As shown in FIG. 1B, the effective aperture of the prior corner reflector 1 is hexagonal, and the area of the effective aperture $A_{effec}$ is $a^2/2\sqrt{3}$, wherein a is the length of the corner reflector 1. By the left figure of FIG. 1C, the corner reflector 1 will have three times of reflection for the incident radar wave IW from a satellite, and therefore the reflected radar wave RW is produced. After the reflected radar wave RW is expanded to a straight line, equivalently, the reflected radar wave RW can be regarded as the equivalent radar wave RW' in the middle figure of FIG. 1C. That is to say, the incident radar wave IW passes through the corner reflector 1 and the virtual corner reflector 1' to generate the equivalent radar wave RW'. The virtual corner reflector 1' is produced by mirroring the corner reflector 1, as shown in the right figure of FIG. 1C. The effective aperture $A_{effect}$ is equivalent to the overlapped portion of the corner reflector 1 and the virtual corner reflector 1'. Further, a corresponding radar cross section (RCS) is $$RCS_{reflector} = \left(4\pi A_{effec}^2\right)/\lambda^2,$$

and the logarithm expression is $RCS_{db}=10 \log RCS_{reflector}$, where $\lambda$ is the radar wavelength.

Overall, the corner reflector 1 in FIG. 1A is the aforesaid large corner reflector, which has the disadvantages of a large volume and higher manufacturing cost. On the other hand, the possibility that the reflection amount and measurement accuracy of the reflected radar wave corresponding to the corner reflector 1 can be further increased.

SUMMARY

The purpose of the present disclosure is to provide a corner reflecting device, which comprises at least one corner reflector. Each reflector has a first right triangle plate, a second right triangle plate and a first isosceles right triangle plate. The shape of the first right triangle plate is the same as that of the second right triangle plate, and neither the first right triangle plate nor the second right triangle plate is an isosceles right triangle plate. A long leg of the second right triangle plate is connected with a long leg of the first right triangle plate. Two legs of the first isosceles right triangle plate are connected with a short leg of the first right triangle plate and a short leg of the second right triangle plate, respectively. An intersection of the long leg of the first right triangle plate, the long leg of the second right triangle plate, the short leg of the first right triangle plate, the short leg of the second right triangle plate, and the two legs of the first isosceles right triangle plate forms a leak hole.

Alternatively, in an embodiment of the aforesaid corner reflecting device, at least one corner reflector has two corner reflectors, which are disposed spaced apart from each other in a mutually inverted manner on the corner reflecting device, in order to let two hypotenuses of the two first isosceles right triangle plates be at two sides of the corner reflecting device, wherein the two sides correspond to each other and are on a same surface of the corner reflecting device.

Alternatively, in an embodiment of the aforesaid corner reflecting device, the corner reflecting device further comprises a carrier, which has two hollow corner reflector accommodation slots on a surface thereof, in order to receive the two corner reflectors, wherein the two corner reflectors are firmly positioned at the carrier; wherein the surfaces of the two corner reflectors present a concave configuration compared with the carrier, in order to let the two leak holes of the two corner reflectors be disposed below the two hollow corner reflector accommodation slots of the carrier respectively.

Alternatively, in an embodiment of the aforesaid corner reflecting device, the surface of the carrier is disposed a plurality of through holes, and the corner reflecting device further comprises a plurality of adjustable rods, which penetrates through the plurality of through holes, each of the plurality of adjustable rods is located at a position on each of the plurality of through holes respectively, wherein an end of the adjustable rod to the position is defined as a first length, and another end of the other adjustable rod to the position is defined as a second length, a ratio is between the first length and the second length and varied, in order to let the corner reflecting device be placed horizontally on a hillside.

Alternatively, in an embodiment of the aforesaid corner reflecting device, the carrier is a quadrilateral metal plate, the plurality of through holes are disposed at four corners of the surface of the carrier, the plurality of adjustable rods are composed of a plurality of threaded rods, a plurality of washers and a plurality of nuts.

Alternatively, in an embodiment of the aforesaid corner reflecting device, the corner reflecting device corresponds to a usage band of an incident radar wave of a Sentinel-1 satellite, a short leg of each of the first right triangle plate and the second right triangle plate is 21.6 cm, the long leg of each of the first right triangle plate and the second right triangle plate is 60 cm.

Alternatively, in an embodiment of the aforesaid corner reflecting device, an incident radar wave of a satellite corresponds to an incident angle of the corner reflector, an effective aperture of the corner reflector is a hexagon or a rhombus.

The purpose of the present disclosure further provides a corner reflecting system, which comprises a plurality of corner reflecting devices, each of which is the same as the aforesaid corner reflecting device, the corner reflecting devices are disposed spaced apart on the hillside in a manner of at least one row or column.

Alternatively, in an embodiment of the corner reflecting system, for the corner reflecting devices in the same row, a hypotenuse of the first right corner reflector of the corner reflector of one of the two adjacent corner reflecting devices faces the hypotenuse of the other first right corner reflector of the other corner reflector of the other one of the two adjacent corner reflecting devices.

Alternatively, in an embodiment of the corner reflecting system, the corner reflecting devices are disposed in the manner of at least one column, for the corner reflecting devices in the same column, a spacing is between every two adjacent corner reflecting devices, and the spacing (SP2) corresponds to an image resolution of a satellite.

Simply speaking, compared with the prior corner reflector, the corner reflecting device and the corner reflecting system provided by the present disclosure have the advantages of draining water and impurities, adapting the incident angle of the incident radar waves of various satellites after special design to the length ratios, a smaller volume, less manufacturing cost, higher measurement accuracy, and better reflection amount of the reflected radar waves after special arrangements.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1A:
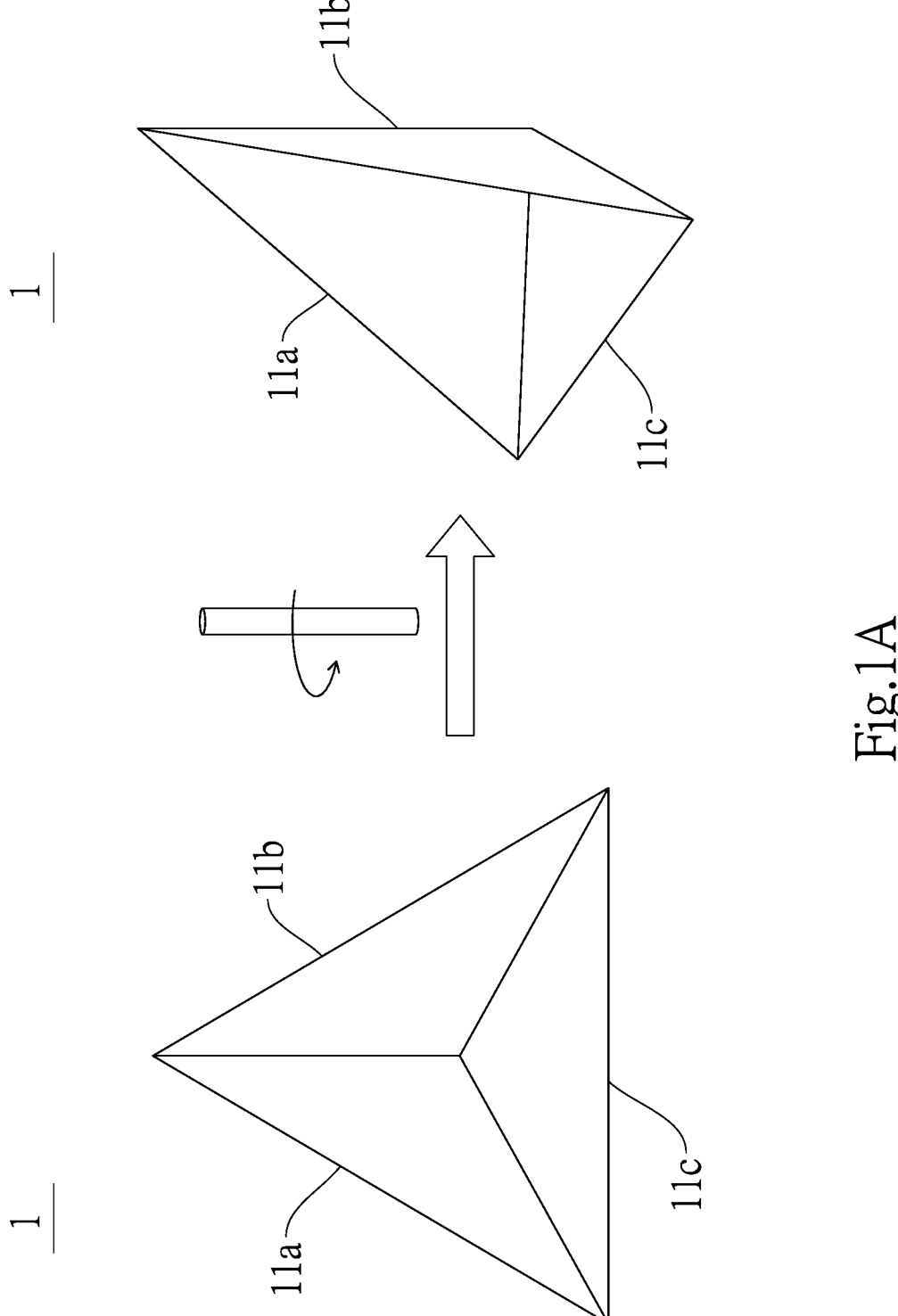
FIG. 1A illustrates a schematic 3-D view of a prior corner reflector in different angles.
Figure 1B:
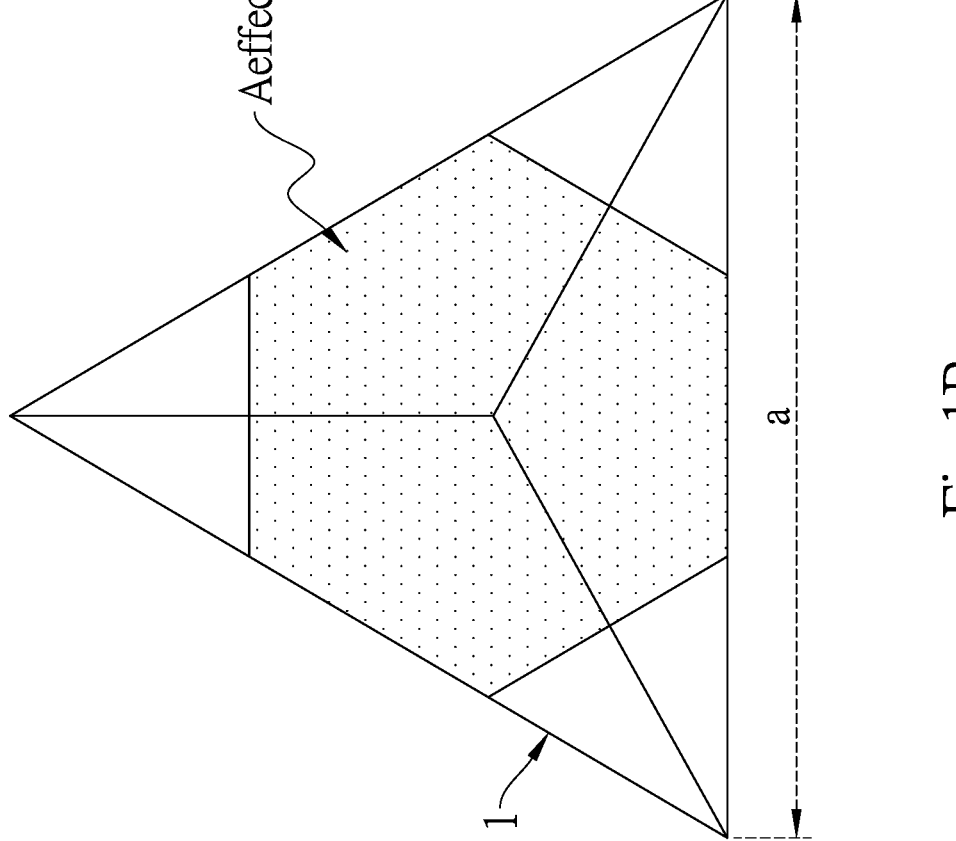
FIG. 1B illustrates a schematic view of an effective aperture of the prior corner reflector.
Figure 1C:
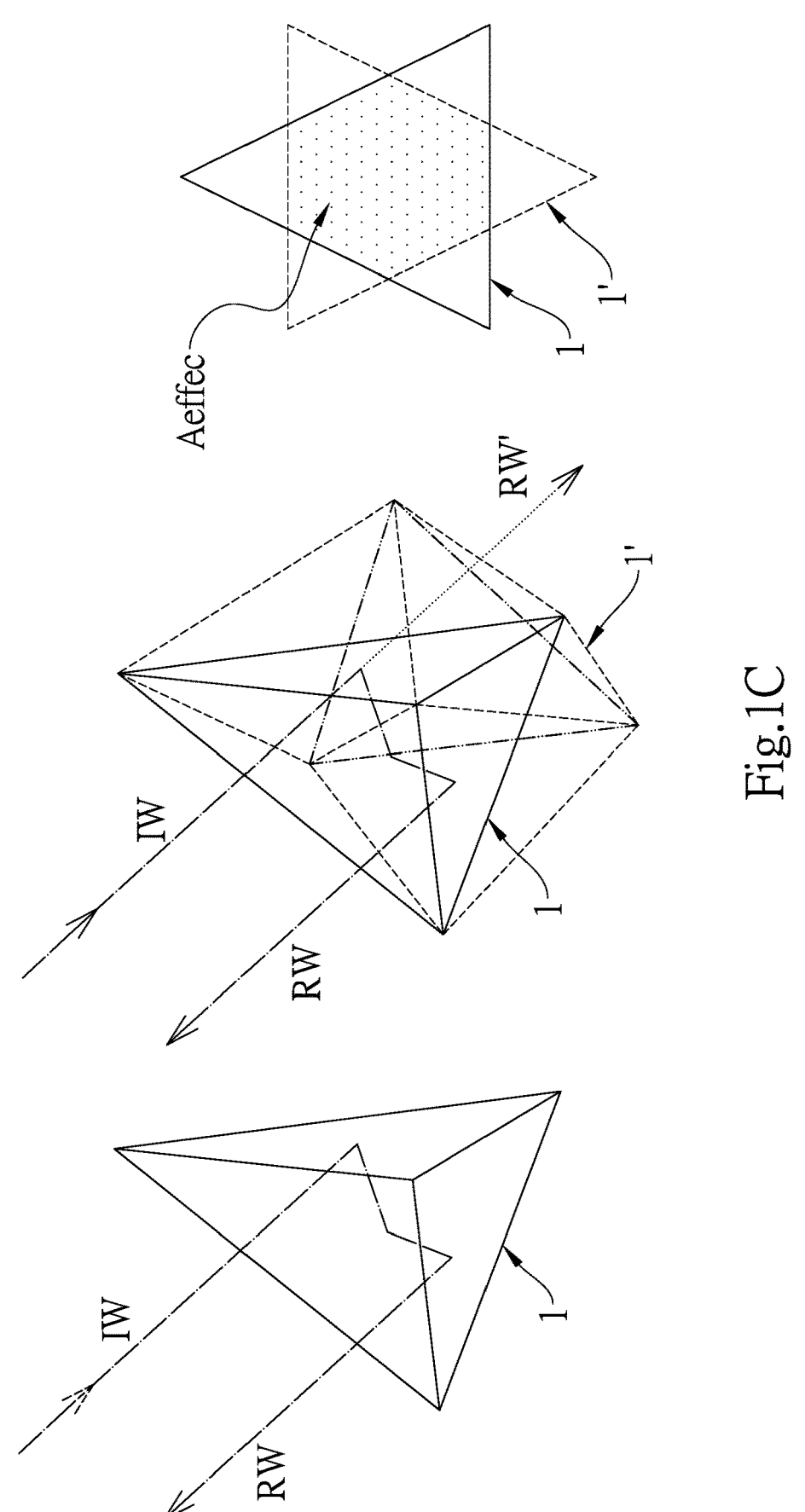
FIG. 1C illustrates an equivalent view of reflected radar waves of the prior corner reflector.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within a receivable error range, the person skilled in the art may solve the technical problem in a certain error range to achieve the basic technical effect.

The following description is of the best-contemplated mode of carrying out the disclosure. This description is made to illustrate the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . ." does not exclude other same elements existing in the process, the method, the article, or the device which includes the element.

The present disclosure provides a corner reflecting device and a corner reflecting system. The two same corner reflectors of the corner reflecting device are two right triangle plates, which are not two isosceles right triangle plates as well. The corner reflector can be adapted to the incident angle of an incident radar wave for having the maximum effective aperture, and the corner reflector can be better to reflect the radar reflection amount of the reflected radar wave at a specific angle in the flat state, and reduce the volume to increase portability. Besides, the corner reflector has leak holes in order to reduce the impact of rainwater and other sediments in the aspect of measurements. Moreover, the plurality of the corner reflecting devices of the corner reflecting system of the present disclosure can be disposed by at least one row or column, so as to increase the radar reflection amount and the accuracy of measurements.

For one embodiment of the present disclosure, the plurality of corner reflecting devices are able to provide clear reflection image information from the Interferometric Synthetic Aperture Radar (InSAR) satellite through the arrangement of an array, and the clear reflection image information can be used for monitoring the ground and hillside deformation. Compared with larger corner reflecting devices, the present disclosure is successfully reducing the cost and difficulties of installment. Further discussions, the wave differences of the two radar images before and after the incident radar waves, reflected by the corner reflecting system or devices, are compared with each other, and measurement differences are then generated. Based on the measurement differences, a radar interferogram is produced and brought into an unwrapping equation to convert it into an actual displacement.

Figure 2:
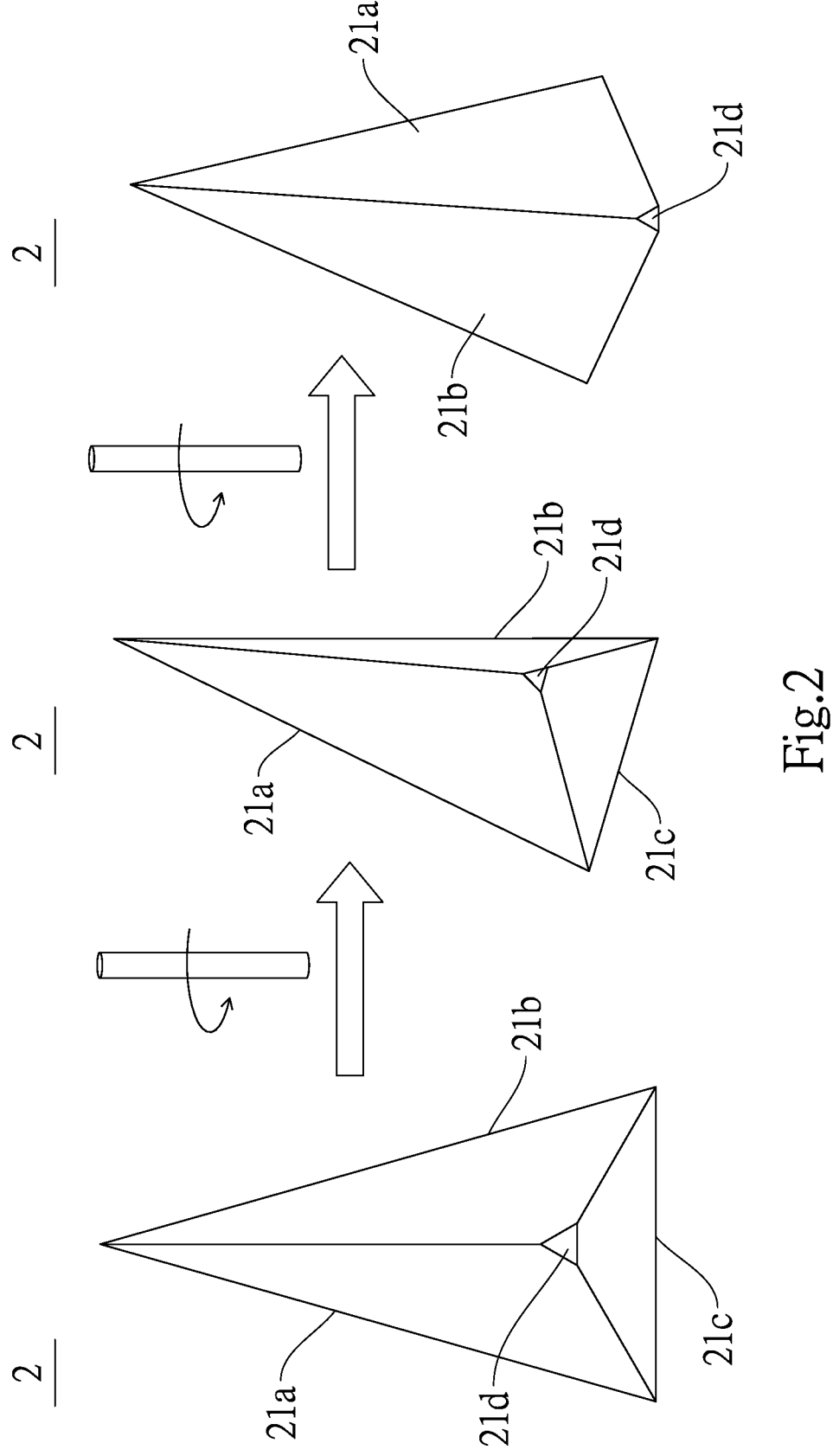
FIG. 2 illustrates several schematic 3-D views of a corner reflector, under different angles according to an embodiment of the present disclosure.

Continuously, FIG. 2 illustrates several schematic 3-D views of an embodiment of a corner reflector, under different angles, of the present disclosure. The corner reflector 2 includes a first right triangle plate 21a, a second right triangle plate 21b and a first isosceles right triangle plate 21c, which are made of metal or other materials with the function of reflecting radar waves.

The shapes of the first right triangle plate 21a and the second right triangle plate 21b are the same, and they are not isosceles right triangle plates. A long leg of the second right triangle plate 21b is connected with a long leg of the first right triangle plate 21a. Two legs of the first isosceles right triangle plate 21c are connected with a short leg of the first right triangle plate 21a and a short leg of the second right triangle plate 21b respectively. That is, the first right triangle plate 21a, the second right triangle plate 21b and the first isosceles right triangle plate 21c are connected with each other at an angle of 90 degrees.

An intersection of the long leg of the first right triangle plate 21a, the long leg of the second right triangle plate 21b, the short leg of the first right triangle plate 21a, the short leg of the second right triangle plate 21b, and the two legs of the first isosceles right triangle plate 21c forms a leak hole 21d. Which means, a junction (or called a connection central point) of the first right angle plate 21a, the second right angle plate 21b and the first isosceles right triangle plate 21c has the leak hole 2d, which is a through hole, and therefore water or other substances deposited on the corner reflector 2 can be leaked out to avoid problems such as rainfall accumulation or ash deposition, so as to not affect the measurement. In prior arts, the corner reflector is composed of three isosceles right triangle plates. Since the shape of the present disclosure is improved compared with the prior arts, that is, the best reflecting angle of the corner reflector 2 is altered. Accordingly, the corner reflector 2 has a better reflection amount for the incident radar waves in a specific incident angle while it is under a horizontal state. Besides, the volume of the corner reflector 2 is highly reduced, and the portability is thus increased as well.

Figure 3:
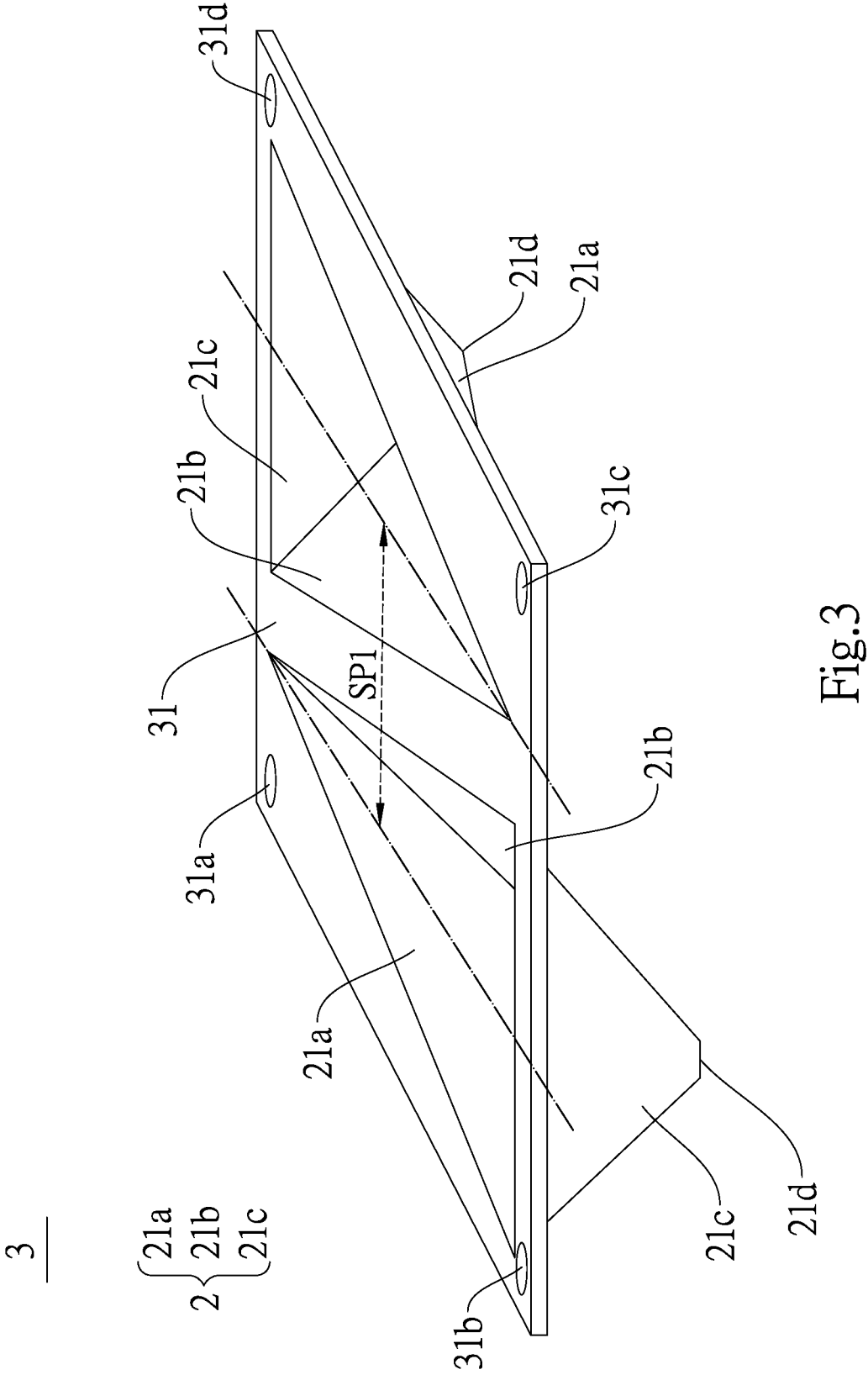
FIG. 3 illustrates a schematic 3-D view of a corner reflecting device according to an embodiment of the present disclosure.

FIG. 3 illustrates a schematic 3-D view of an embodiment of a corner reflecting device of the present disclosure. The corner reflecting device 3 is composed of at least one corner reflector 2. In the embodiment, the corner reflecting device 3 has two corner reflectors 2. More, the corner reflecting device 3 has the two corner reflectors 2 and a carrier 31, and the two corner reflectors 2 are disposed spaced apart from each other in a mutually inverted manner on the carrier 31 of the corner reflecting device 3, in order to let the two hypotenuses of the two first isosceles right triangle plates 21c be at two sides of the corner reflecting device 3, wherein the two sides correspond to each other and are on a same surface of the corner reflecting device 3, wherein there is a spacing SP1 is between the two adjacent corner corners 2.

The carrier 31 is a quadrilateral metal plate, but not limited thereto. A surface of the carrier 31 has two hollow corner reflector accommodation slots, in order to receive the two corner reflectors 2, wherein the two corner reflectors 2 are firmly positioned at the carrier 31. A plurality of through holes 31a-31d are disposed at four corners of the surface of the carrier 31. The surfaces of the two corner reflectors 2 present a concave configuration compared with the carrier 31, in order to let the two leak holes 21d of the two corner reflectors 2 be disposed below the two hollow corner reflector accommodation slots of the carrier 31 respectively. Simply speaking, the corner reflecting device 3 is a bidirectional corner reflecting device that corresponds to the direction and azimuth angle of the satellite's ascending and descending orbit shooting.

Figure 4:
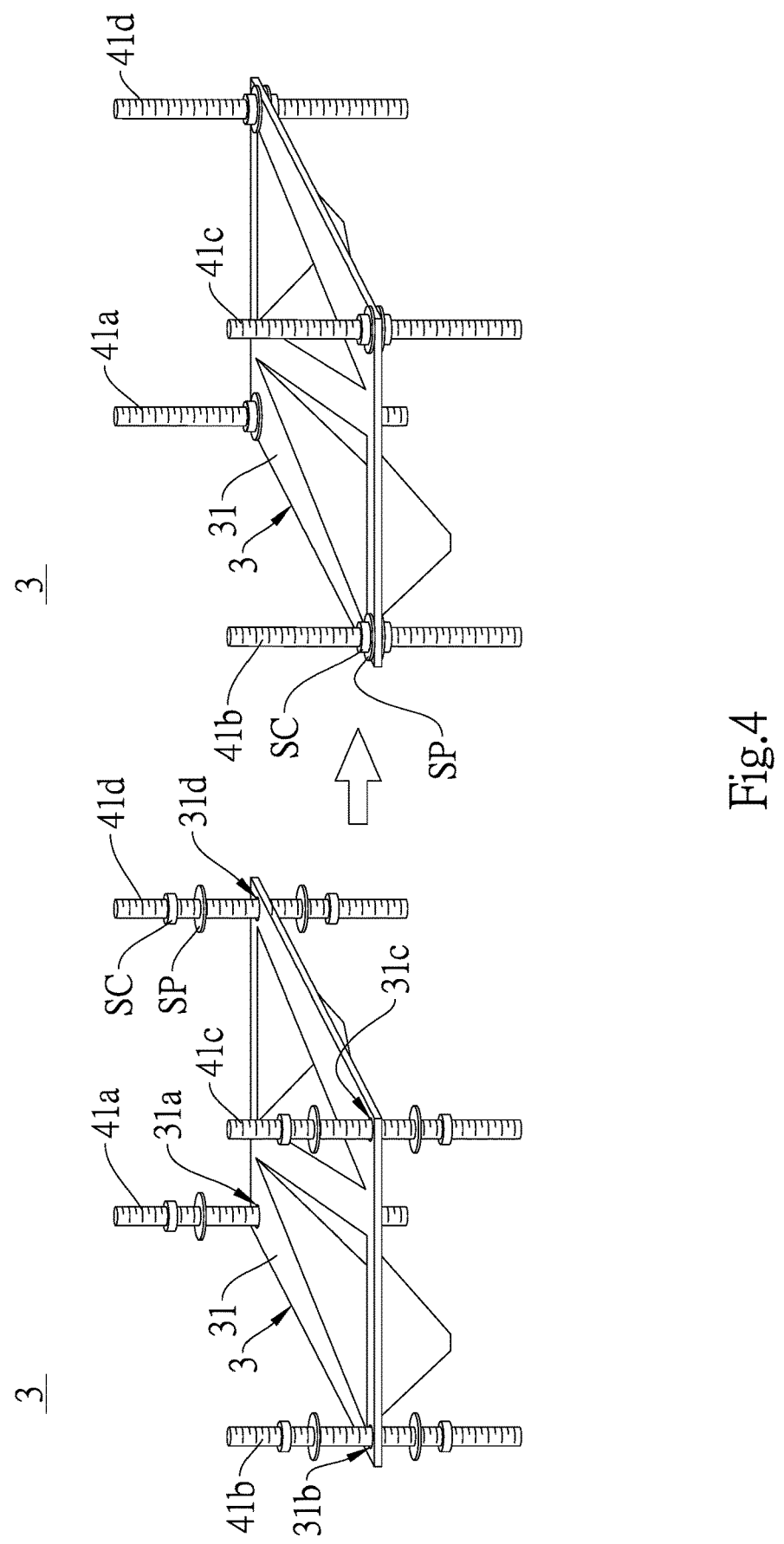
FIG. 4 illustrates a schematic installing view of the corner reflecting device placed horizontally on a hillside according to an embodiment of the present disclosure.

Please refer to FIG. 4, which illustrates a schematic installing view of an embodiment of the corner reflecting device placed horizontally on a hillside of the present disclosure. The corner reflecting device 3 further has a plurality of adjustable rods, which are composed of a plurality of threaded rods 41*a*-41*d*, a plurality of washers SP and a plurality of nuts SC, but with no limitations. The plurality of threaded rods 41*a*-41*d* penetrates through the plurality of through holes 31*a*-31*d* individually, and every two nuts SC and every two washers SP pass through each of the threaded rods 41*a*-41*d*. The washer SP is in between the corresponding nut SC and the carrier 31, in order to disperse the application forces. Each of the plurality of adjustable rods is located at a position on each of the plurality of through holes (31*a*-31*d*) respectively, wherein an end, as a top end, of the adjustable rod to the position is defined as a first length, and another end, as a lower end, of the adjustable rod to the position is defined as a second length, a ratio is between the first and second lengths and varied. Therefore, through adjusting the nut SC to alter the adjustable rod, that is, the ratio of the first length and the second length is controllable. Since a hillside surface may be an oblique slope, by adjusting the ratio, the corner reflecting device 3 can be placed horizontally on the hillside.

Figure 5:
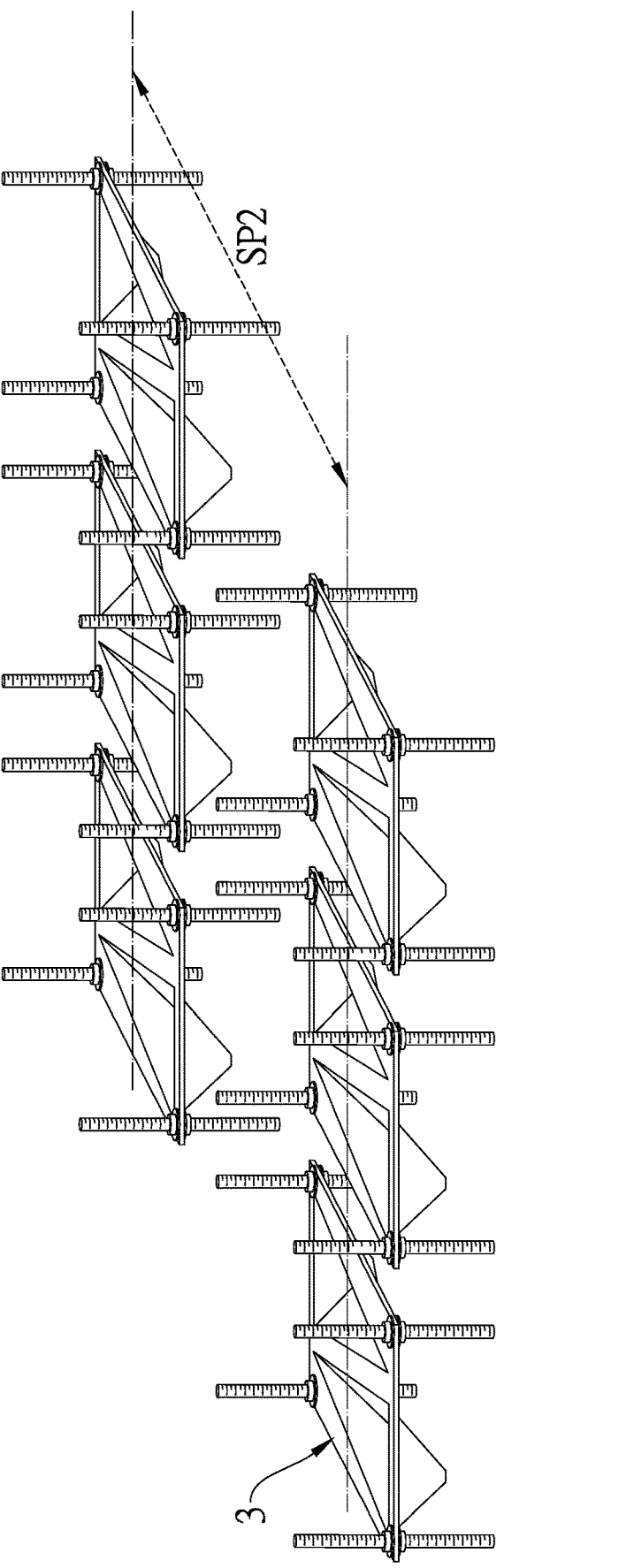
FIG. 5 illustrates a schematic 3-D view of a corner reflecting system according to an embodiment of the present disclosure.

Continuously, with regard to FIG. 4, FIG. 5 illustrates a schematic 3-D view of an embodiment of a corner reflecting system of the present disclosure. The corner reflecting system has the plurality of corner reflecting devices 3, but not limited to the corner reflecting device 3 in FIG. 4. The corner reflecting devices 3 is disposed spaced apart on the hillside in a manner of at least one row or column, such as at least two rows in an array arrangement. For the corner reflecting devices 3 in the same row, a hypotenuse of the first right corner reflector 21*a* of the corner reflector 2 of one of the two adjacent corner reflecting devices 3 faces the hypotenuse of the other first right corner reflector 21*a* of the other corner reflector 2 of the other one the two adjacent corner reflecting devices 3.

As shown in FIG. 5, a distance between two rows is defined as a spacing SP2 (that is, two adjacent corner reflecting devices 3 in the same column have a distance in between). The spacing SP2 corresponds to an image resolution of a satellite. For instance, the lowest resolution of the image from a Sentinel-1 is 5 meters, hence the spacing SP2 adopts shorter than 5-meter to be a unit of an interval. The plurality of corner reflecting devices 3 are arranged by at least one row as an interval, so as to reduce destructive interference and increase constructive interference. Therefore, the amount of the reflected radar waves in a single area (single pixel) will be raised as well. For the entire system, it does effectively increase the accuracy of measurement.

Figure 6:
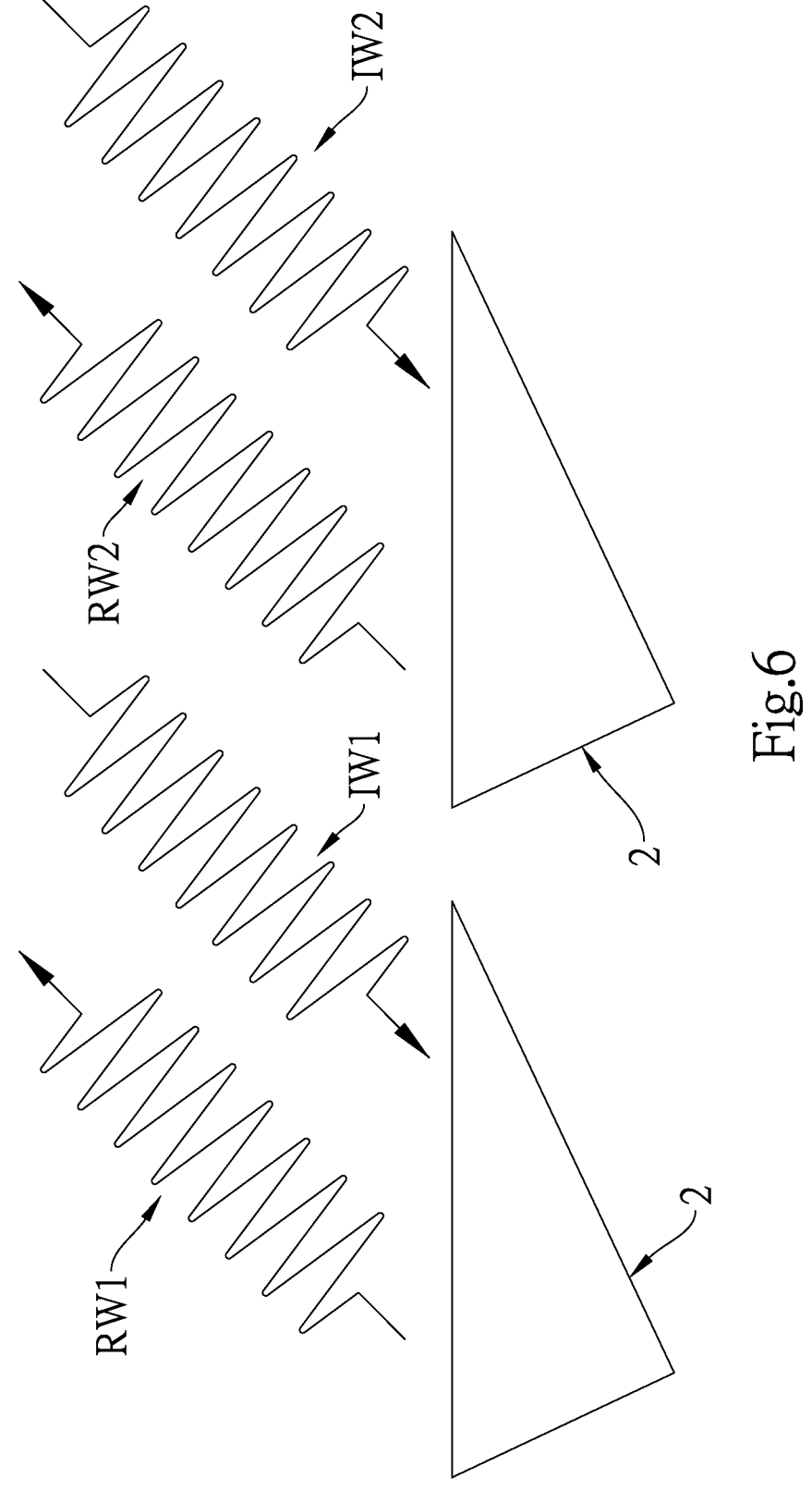
FIG. 6 illustrates a schematic view of two vertical corner reflectors reflecting incident radar waves according to an embodiment of the present disclosure.

FIG. 6 illustrates a schematic view of an embodiment of two corner reflectors in column reflecting incident radar waves of the present disclosure. The two corner reflectors 2 receive two incident radar waves IW1, IW2 respectively. If the hypotenuse of the corner reflector 2 (the first right triangle plate (21*a* in FIG. 2) is longer than the wavelength of the radar wave, the incident radar waves IW1, IW2 may perform three times of reflection on the two corner reflectors 2 respectively, and form two reflected radar waves RW1, RW2. The two reflected radar waves RW1, RW2 are reflected toward another path that is not the same as the path of the incident radar waves IW1, IW2, but the reflecting direction of the reflecting path of the two reflected radar waves RW1, RW2 is toward the satellite. Under the condition of the two corner reflectors 2 in the arrangement of a column direction, the reflected radar waves RW1 and RW2 will interfere to each other, so that the reflection amount at some angles will be eliminated due to destructive interference, and resulting in a reduction in the signal strength received by the satellite.

Figure 7:
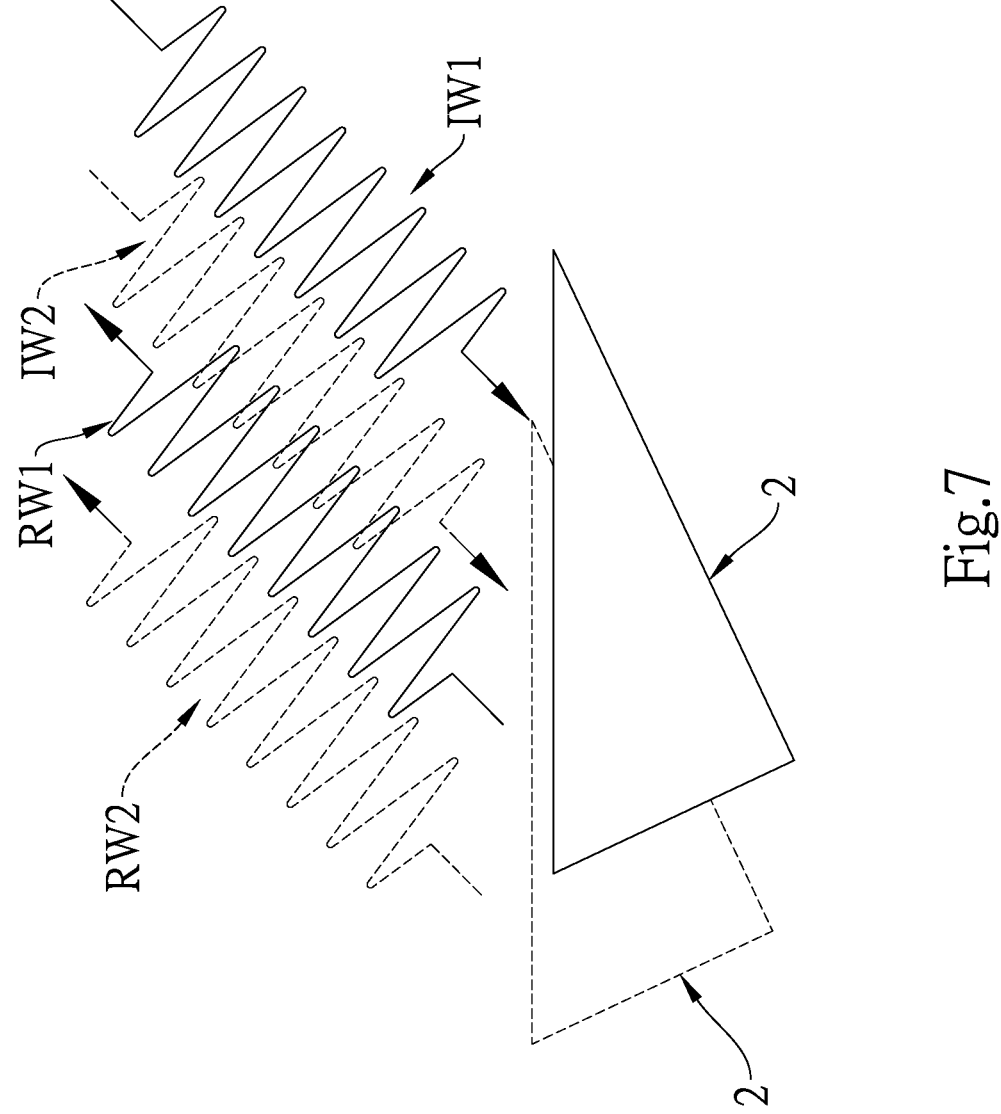
FIG. 7 illustrates a schematic view of two horizontal corner reflectors reflecting incident radar waves according to an embodiment of the present disclosure.

FIG. 7 illustrates a schematic view of an embodiment of two horizontal corner reflectors reflecting incident radar waves of the present disclosure. The situation, without the same as the two corner reflectors 2 in the arrangement in column direction, is that the reflected radar waves RW1 and RW2 of the two corner reflectors 2 are in row direction, so that the reflection amount at most angles is enhanced due to constructive interference, in order to let the signal strength received by the satellite be highly increased. Simply speaking, to arrange the corner reflectors 2 in a row will be a better way, but the spacing shall correspond to the image resolution of an image from a satellite.

Figure 8:
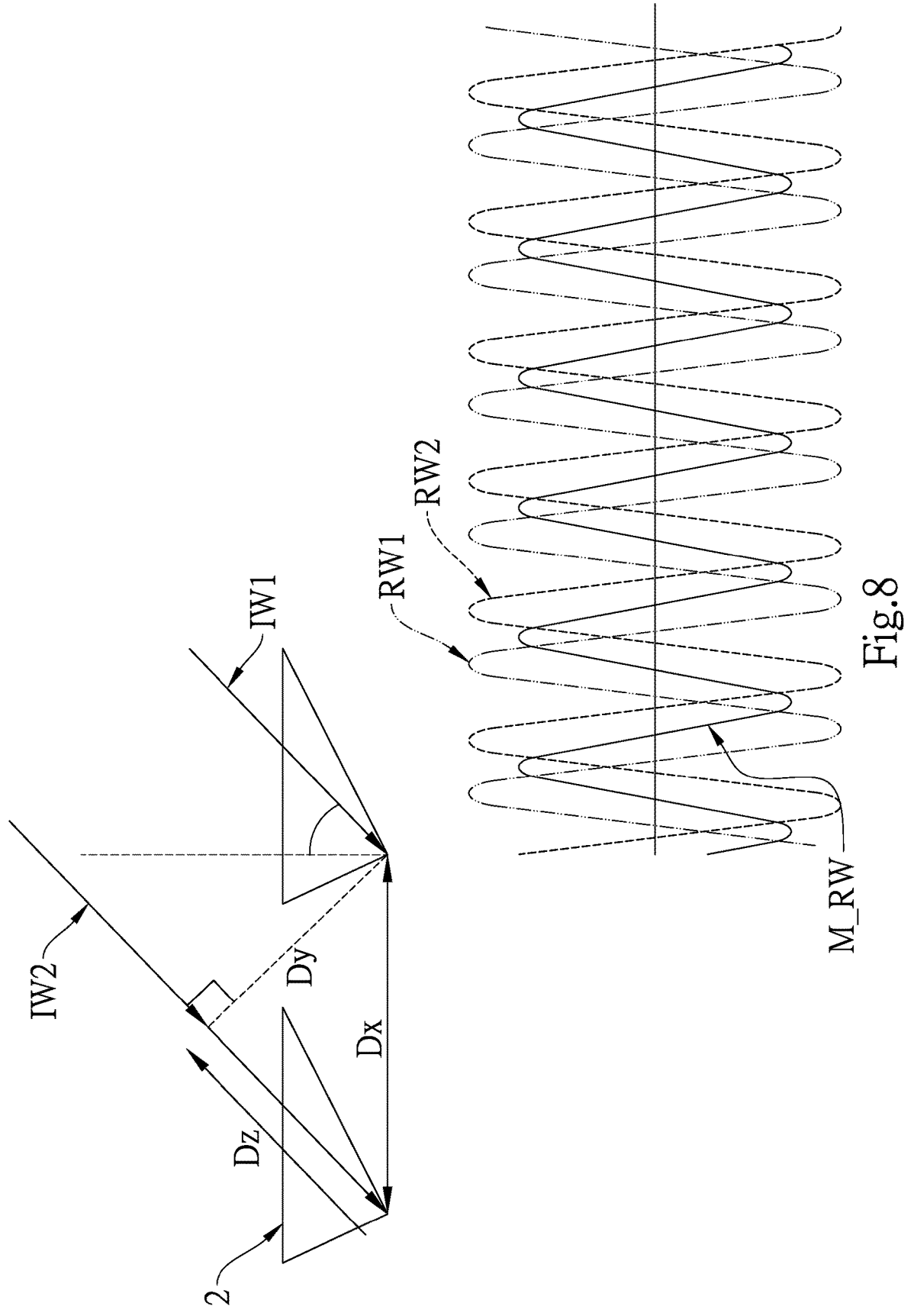
FIG. 8 illustrates a schematic waveform view of two reflected radar waves, interfered to each other after the two vertical corner reflectors reflecting the incident radar waves according to an embodiment of the present disclosure.

FIG. 8 illustrates a schematic waveform view of an embodiment of two reflected radar waves, interfered to each other, after the two corner reflectors in column reflecting the incident radar waves of the present disclosure. Compared with the reflected radar wave RW1, the reflected radar wave RW2 will have an optical path difference of 2*Dz, wherein Dz is equal to n*λ+Δλ, n is integer, λ is wavelength, and Δλ is remainder wavelength. Assuming Δλ is λ/2, the amplitude of the mixed radar wave M_RW after interference is almost 0. If Δλ is 0, the amplitude of the mixed radar wave M_RW after interference is almost twice the amplitude of the reflected radar wave RW1 or RW2.

Dx is a spacing between two corner reflectors 2, and the two corner reflectors 2 are in the column direction. That is, as SP2 as shown in FIG. 5, those two corner reflectors 2 are in the same column direction. Hence, a best reflection amount can be reached through adjusting the spacing between the two corner reflectors 2. More, the vertical distance between the two incident radar waves IW1, IW2 is Dy. Assuming the amplitudes of the two reflected radar waves IW1, IW2 are both 1, all relevant parameters in mathematical relationships can be expressed as follows:

$$Dy = Dx * \cos\theta i;$$

$$Dz = Dx * \sin\theta i;$$

$$Dz = n * \lambda + \Delta\lambda, \text{ and}$$

$$M\_RW\_amp = \sin(2\pi * Dx/\lambda) + \sin(2\pi * (Dx - \Delta\lambda)/\lambda)$$

wherein M_RW_amp represents the amplitude of a mixed radar wave M_RW, and θi represents the incident angle of the incident radar wave IW1 or the incident radar wave IW2, as shown in FIG. 8. Through the above mathematical relationship (that is, the aforementioned solving equation), a better distance Dx can be solved to greatly increase the amount of reflection.

Figure 9:
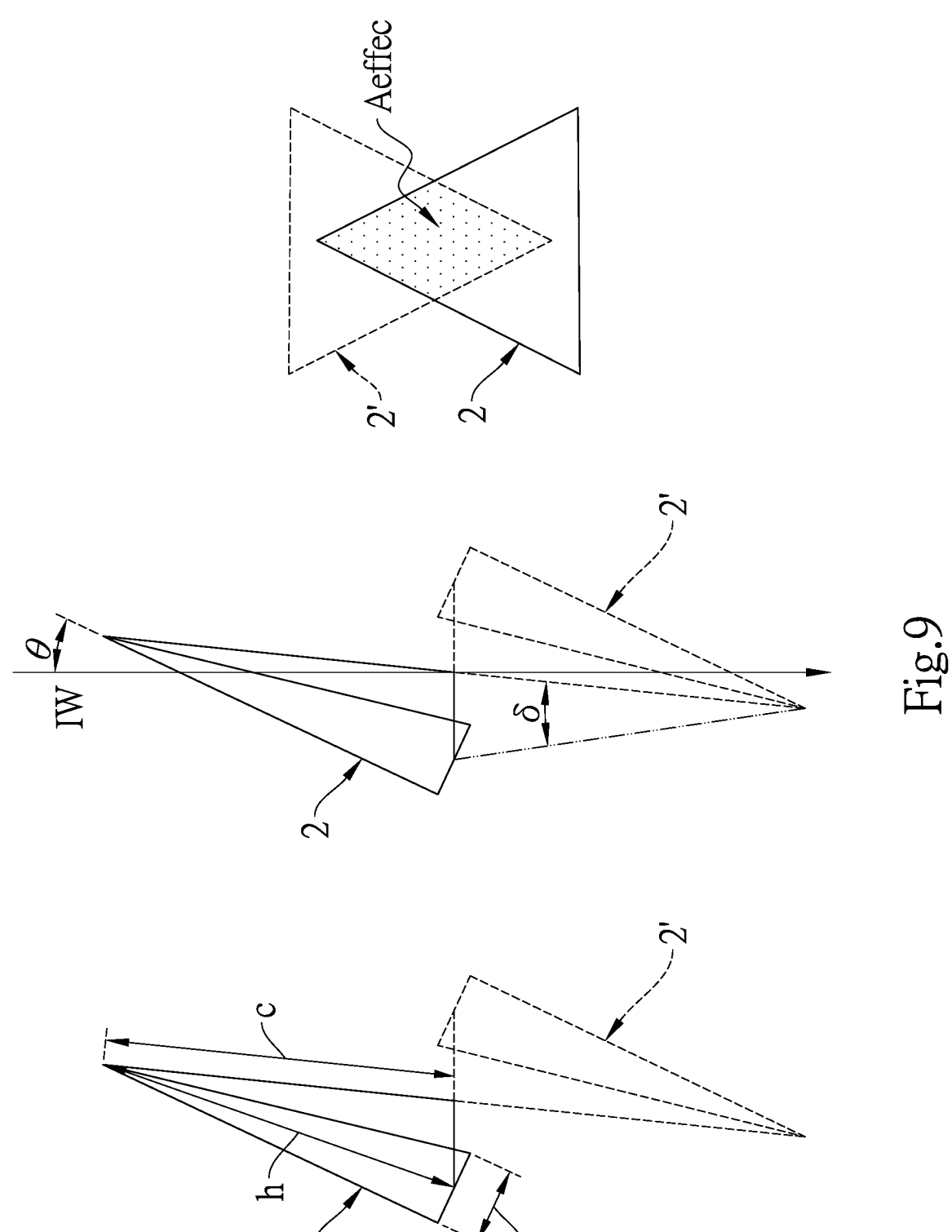
FIG. 9 illustrates a schematic view of an effective aperture of the corner reflector according to an embodiment of the present disclosure.

Please continuously refer to FIG. 9, which illustrates a schematic view of an effective aperture of the corner reflector of the present disclosure. The incident radar wave IW transforms the reflected radar wave after three times of reflection via the corner reflector 2. The reflected radar wave spread along a straight line is equivalent to the incident radar wave IW passing through the corner reflector 2 and the virtual corner reflector 2', wherein the corner reflector 2 and the virtual corner reflector 2' are located in a mirror relationship, that is, if the corner reflector 2 is at an up and left position, the virtual corner reflector 2' is thus at a down and right position, as shown in FIG. 9. An angle θ between the incident radar wave IW and the central line of the corner reflector 2 connecting with the central point is less than an angle δ (the angle between the long leg of the first right triangle plate or the second right triangle plate and the hypotenuse thereof), so the effective aperture $A_{effec}$ is a rhombus. Further, for the embodiment, the area formula of the effective aperture $A_{effec}$ is listed below:

$$A_{effec} = \frac{a \cdot c^2 \sin^2(\theta)}{h \cdot \sin(\theta + \delta)} \quad \ldots \ldots \ldots \ldots \ldots \ldots \ldots \ldots \ldots \text{ for } \theta < \delta,$$

wherein a is the length of the hypotenuse of the first isosceles right triangle plate, c is the length (the distance between the top point of the corner reflector 2 and the central point) of the long leg of the first right triangle plate or the second right triangle plate, and h is the distance between the top point of the corner reflector 2 and the hypotenuse of the first right triangle plate.

Figure 10:
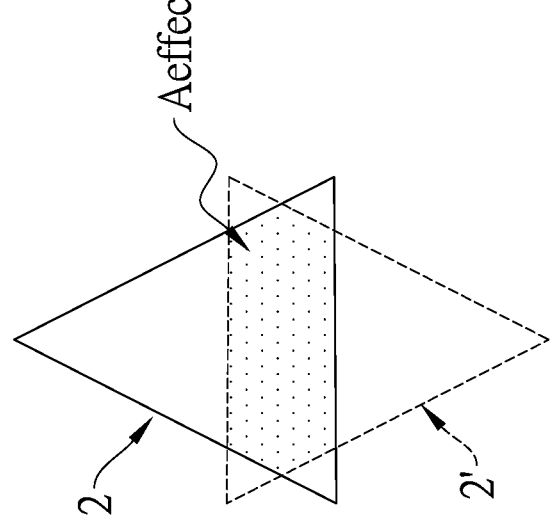
FIG. 10 illustrates another schematic view of the effective aperture of the corner reflector according to an embodiment of the present disclosure.
Figure 10:
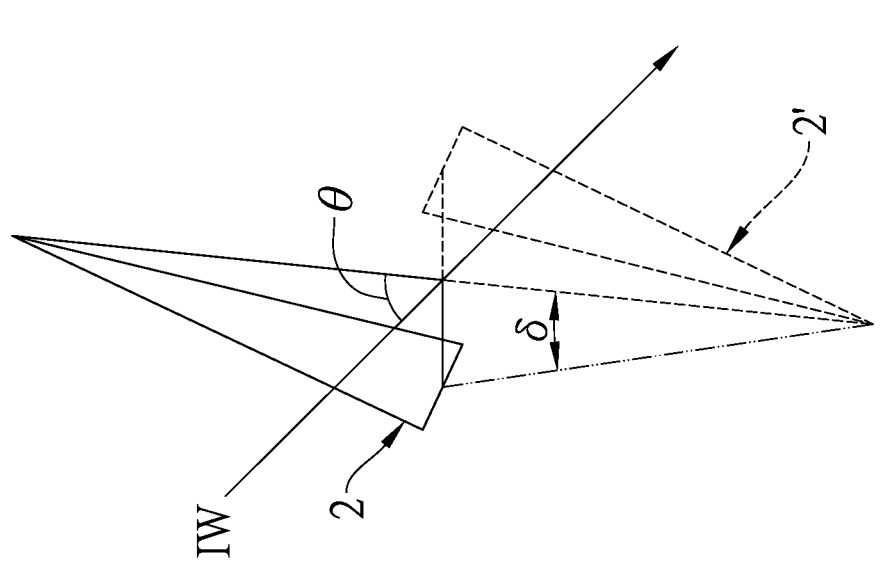

With reference to FIG. 10, which illustrates another schematic view of the effective aperture of the corner reflector of the present disclosure. FIG. 10 differs from FIG. 9, and shows that the angle θ between the incident radar wave IW and the central line, connecting the central point, of the corner reflector 2 is greater than the angle δ, so the effective aperture $A_{effec}$ is hexagonal. In addition, the area formula of the effective aperture $A_{effec}$ in the embodiment is listed below:

$$A_{effec} = \frac{ah \cdot \sin^2(\delta) \cdot \cos^2(\theta) \cdot \sin(\theta - \delta)}{\sin(\theta + \delta)} \quad \ldots \text{ for } \theta > \delta.$$

According to FIG. 9 and FIG. 10, through altering the shape of the corner reflector 2 is the way of deciding the condition of the effective aperture $A_{effec}$ and the largest incident angle (or the reflecting angle).

Figure 11:
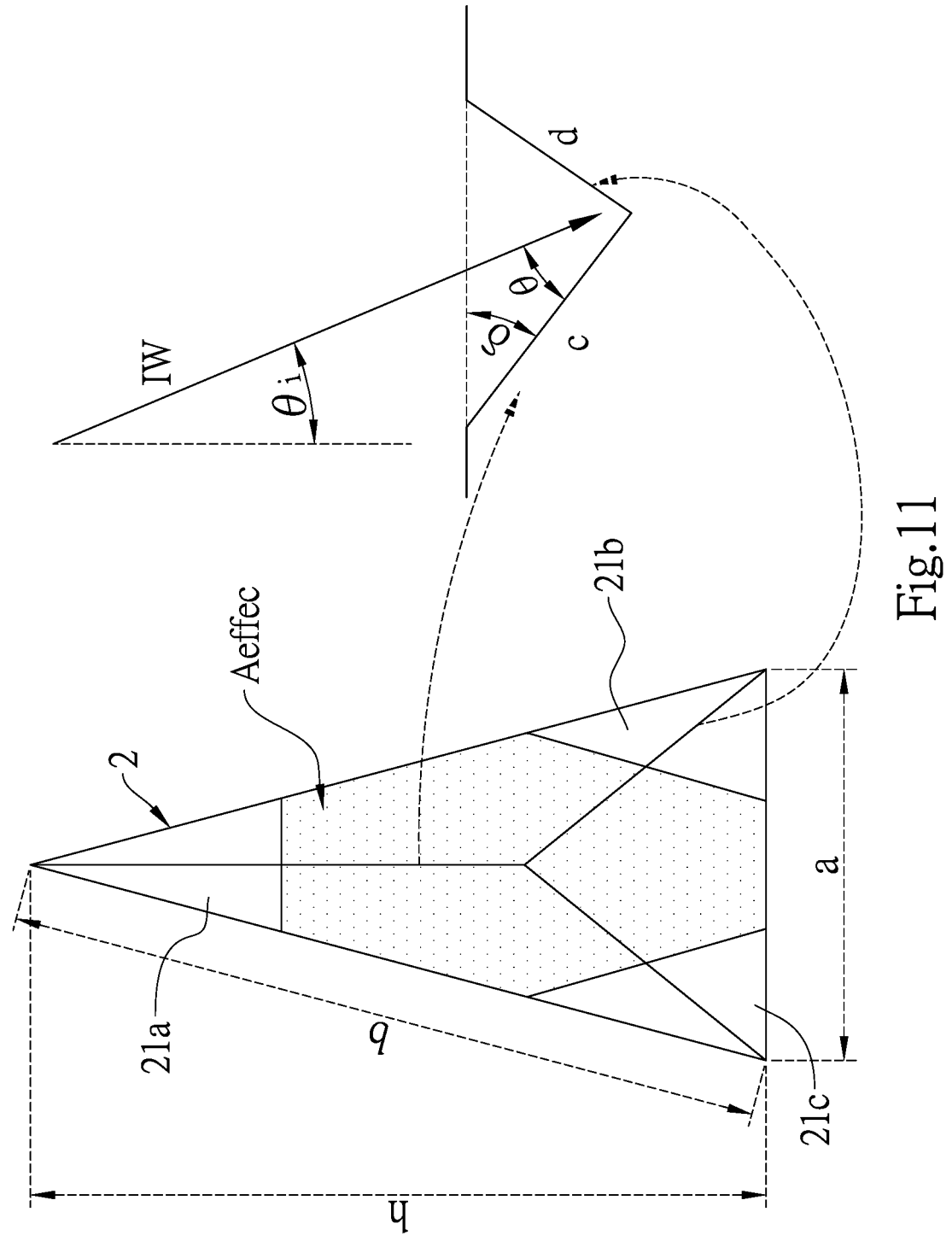
FIG. 11 illustrates another schematic view of the effective aperture of the corner reflector according to an embodiment of the present disclosure.
Figure 12:
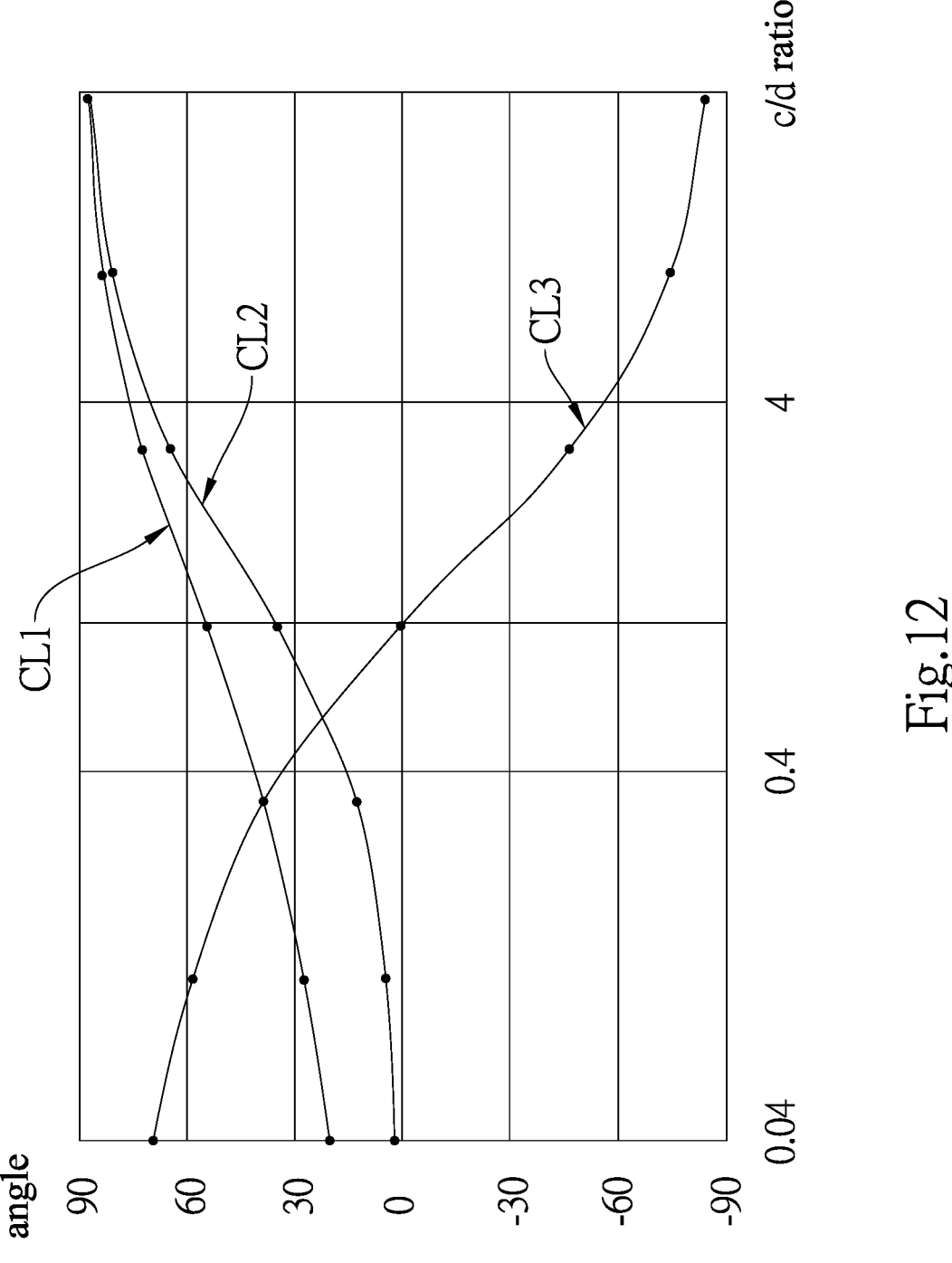
FIG. 12 illustrates a graph view of a ratio of the incident angle and the lengths of the corner reflector according to an embodiment of the present disclosure.

Please simultaneously refer to FIG. 11 and FIG. 12, which illustrate another schematic view of the effective aperture of the corner reflector of the present disclosure and a graph view of a ratio of the incident angle and the lengths of the corner reflector of the present disclosure, the relationships among the incident angle θi of the incident radar wave IW, as shown in FIG. 11, the angle θ and the angle δ are θi=90−δ−θ, a length d is equal to the length a, which is the length of the hypotenuse of the first isosceles right triangle plate, and c is the length of the long leg of the first right triangle plate. In FIG. 12, a curve CL1 is the relationship between the length ratio d/c and the angle δ, a curve CL2 is the relationship between the length ratio d/c and the angle θ, and a curve CL3 is the relationship between the length ratio d/c and the incident angle θi.

The incident angle θi of the incident radar wave of the Sentinel-1 satellite is in the range of 20° to 47°. Therefore, under the condition of analyzed image quality being accepted, the incident angle θi is between 29 and 46°. Additionally, the mountain area of Taiwan is mostly located in the central part of an image. Hence, the corner reflector 2 is designed at 36°. Based on the curve CL3, if the incident angle is 36°, and the corresponding d/c ratio is about 0.36. To adapt to other bands with larger wavelengths, such as the band of the Sentinel-1 satellite is a band C with about 5.5-cm wavelength, the reflection amount of a single corner reflector 2 is added, as shown in FIG. 11. On the basis of FIG. 11, the short leg of each of the first right triangle plate and the second right triangle plate is 21.6 cm, and the long leg of each of the first right triangle plate and the second right triangle plate is 60 cm.

In summary, the present disclosure provides a corner reflecting device and a corner reflecting system, and the corner reflecting device and the corner reflecting system can be laid flat on the ground. Also, it is able to provide the best reflection angle for synthetic aperture radar (SAR) satellites, and use at least one row of arrangement to increase the reflection intensity of the reflected radar waves from SAR satellites. In other words, through designing aforesaid corner reflecting device and corner reflecting system, they not only adapt the incident angle directions of the incident radar waves of various satellites, but also drain water, in order to avoid depositing rainwater and other substances for causing measurement errors. Else, compared with prior corner reflectors, the above-mentioned corner reflecting device has the characteristics of a smaller volume, less manufacturing cost, better reflection amount of the reflected radar waves, and higher measurement accuracy.

Although the present disclosure is disclosed in the foregoing embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. A corner reflecting device comprising:
  at least one corner reflector, having:
    a first right triangle plate;
    a second right triangle plate, a shape thereof being the same as a shape of the first right triangle plate, one long leg of the second right triangle plate being connected with one long leg of the first right triangle plate; and
    a first isosceles right triangle plate, two legs thereof being connected with a short leg of the first right triangle plate and a short leg of the second right triangle plate respectively;
  wherein neither the first right triangle plate nor the second right triangle plate is an isosceles right triangle plate, an intersection of the long leg of the first right triangle plate, the long leg of the second right triangle plate, the short leg of the first right triangle plate, the short leg of the second right triangle plate, and the two legs of the first isosceles right triangle plate forming a leak hole.

2. The corner reflecting device according to claim 1, wherein the at least one corner reflector has two corner reflectors, which are disposed spaced apart from each other in a mutually inverted manner on the corner reflecting device, in order to let two hypotenuses of the two first isosceles right triangle plates be at two sides of the corner reflecting device, wherein the two sides correspond to each other and are on a same surface of the corner reflecting device.

3. The corner reflecting device according to claim 2 further comprising:
  a carrier, having two hollow corner reflector accommodation slots on a surface thereof, in order to receive the two corner reflectors, wherein the two corner reflectors are firmly positioned at the carrier;
  wherein the surfaces of the two corner reflectors present a concave configuration compared with the carrier, in order to let the two leak holes of the two corner reflectors be disposed below the two hollow corner reflector accommodation slots of the carrier respectively.

4. The corner reflecting device according to claim 3, wherein the surface of the carrier is disposed a plurality of through holes, further comprising:

a plurality of adjustable rods, penetrating through the plurality of through holes, each of the plurality of adjustable rods being located at a position on each of the plurality of through holes respectively, wherein an end of the adjustable rod to the position is defined as a first length, and another end of the other adjustable rod to the position is defined as a second length, a ratio being between the first length and the second length and varied, in order to let the corner reflecting device be placed horizontally on a hillside.

5. The corner reflecting device according to claim 4, wherein the carrier is a quadrilateral metal plate, the plurality of through holes being disposed at four corners of the surface of the carrier, the plurality of adjustable rods being composed of a plurality of threaded rods, a plurality of washers and a plurality of nuts.

6. A corner reflecting system comprising:

a plurality of corner reflecting devices, each of which being the same as the corner reflecting device according to claim 4, the corner reflecting devices being disposed spaced apart on the hillside in a manner of at least one row or column.

7. The corner reflecting system according to claim 6, wherein the corner reflecting devices are disposed in the manner of at least one row, for the corner reflecting devices in the same row, a hypotenuse of the first right corner reflector of the corner reflector of one of the two adjacent corner reflecting devices facing the hypotenuse of the first right corner reflector of the other corner reflector of the other one of the two adjacent corner reflecting devices.

8. The corner reflecting system according to claim 6, wherein the corner reflecting devices are disposed in the manner of at least one column, for the corner reflecting devices in the same column, a spacing being between every two adjacent corner reflecting devices, and the spacing corresponding to an image resolution of a satellite.

9. The corner reflecting system according to claim 6, wherein the carrier is a quadrilateral metal plate, the plurality of through holes being disposed at four corners of the surface of the carrier, the plurality of adjustable rods being composed of a plurality of threaded rods, a plurality of washers and a plurality of nuts.

10. The corner reflecting system according to claim 6, wherein corresponding to a usage band of an incident radar wave of a Sentinel-1 satellite, a short leg of each of the first right triangle plate and the second right triangle plate being 21.6 cm, the long leg of each of the first right triangle plate and the second right triangle plate being 60 cm.

11. The corner reflecting system according to claim 6, wherein an incident radar wave of a satellite corresponds to an incident angle of the corner reflector, an effective aperture of the corner reflector being a hexagon or a rhombus.

12. The corner reflecting device according to claim 1, wherein the corner reflecting device corresponding to a usage band of an incident radar wave of a Sentinel-1 satellite, a short leg of each of the first right triangle plate and the second right triangle plate being 21.6 cm, the long leg of each of the first right triangle plate and the second right triangle plate being 60 cm.

13. The corner reflecting device according to claim 1, wherein an incident radar wave of a satellite corresponds to an incident angle of the corner reflector, an effective aperture of the corner reflector being a hexagon or a rhombus.

* * * * *